United States Patent
Javli et al.

(10) Patent No.: US 7,725,367 B2
(45) Date of Patent: May 25, 2010

(54) METHOD AND SYSTEM FOR DETERMINING A COSTING SEQUENCE FOR TRANSFERS BETWEEN A PLURALITY OF COST GROUPS

(75) Inventors: Veeresha Javli, Foster City, CA (US); Lina C. Velasquez, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1003 days.

(21) Appl. No.: 11/100,196

(22) Filed: Apr. 5, 2005

(65) Prior Publication Data

US 2006/0059008 A1    Mar. 16, 2006

Related U.S. Application Data

(60) Provisional application No. 60/608,677, filed on Sep. 10, 2004.

(51) Int. Cl.
*G06Q 10/00* (2006.01)
*G06F 17/50* (2006.01)
*G06F 17/00* (2006.01)

(52) U.S. Cl. .................. 705/28; 705/29; 705/400

(58) Field of Classification Search ............. 705/28, 705/29, 400
See application file for complete search history.

(56) References Cited

U.S. PATENT DOCUMENTS

| | | | |
|---|---|---|---|
| 5,249,120 A | 9/1993 | Foley | |
| 5,675,785 A | 10/1997 | Hall et al. | |
| 6,356,880 B1 | 3/2002 | Goossens et al. | |
| 6,829,604 B1 | 12/2004 | Tifft | |
| 7,177,834 B1 | 2/2007 | Maestle | |
| 7,302,409 B2 | 11/2007 | Hayashi | |
| 2002/0107864 A1 | 8/2002 | Battas et al. | |
| 2002/0111886 A1 | 8/2002 | Chenevich et al. | |
| 2003/0002445 A1 | 1/2003 | Fullana et al. | |
| 2003/0014287 A1* | 1/2003 | Williams et al. | 705/7 |
| 2003/0083888 A1 | 5/2003 | Argenton et al. | |
| 2003/0115080 A1 | 6/2003 | Kasravi et al. | |
| 2003/0120504 A1 | 6/2003 | Kruk et al. | |
| 2003/0172008 A1* | 9/2003 | Hage et al. | 705/28 |
| 2003/0216977 A1 | 11/2003 | Hayashi | |
| 2006/0155655 A1 | 7/2006 | Shen | |

FOREIGN PATENT DOCUMENTS

EP    1362542 A1    11/2003

OTHER PUBLICATIONS

1998 Winter Simulation Conference; Proceedings of the 30th conference on Winter Simulation, Washington, D.C., United States; pp. 1387-1394.*

* cited by examiner

*Primary Examiner*—John W Hayes
*Assistant Examiner*—Tonya Joseph
(74) *Attorney, Agent, or Firm*—Townsend and Townsend and Crew, LLP

(57) ABSTRACT

Embodiments of the present invention are directed to a method for sequencing cost calculation. In one embodiment a processing sequence, comprising a plurality of hierarchy levels, is created for a plurality of cost groups. The processing sequence is used in an iterative process for calculating the cost of an item of the plurality of cost groups. In embodiments of the present invention, the iterative process is repeated until the costs of a plurality of items of the plurality of cost groups have been calculated.

20 Claims, 7 Drawing Sheets

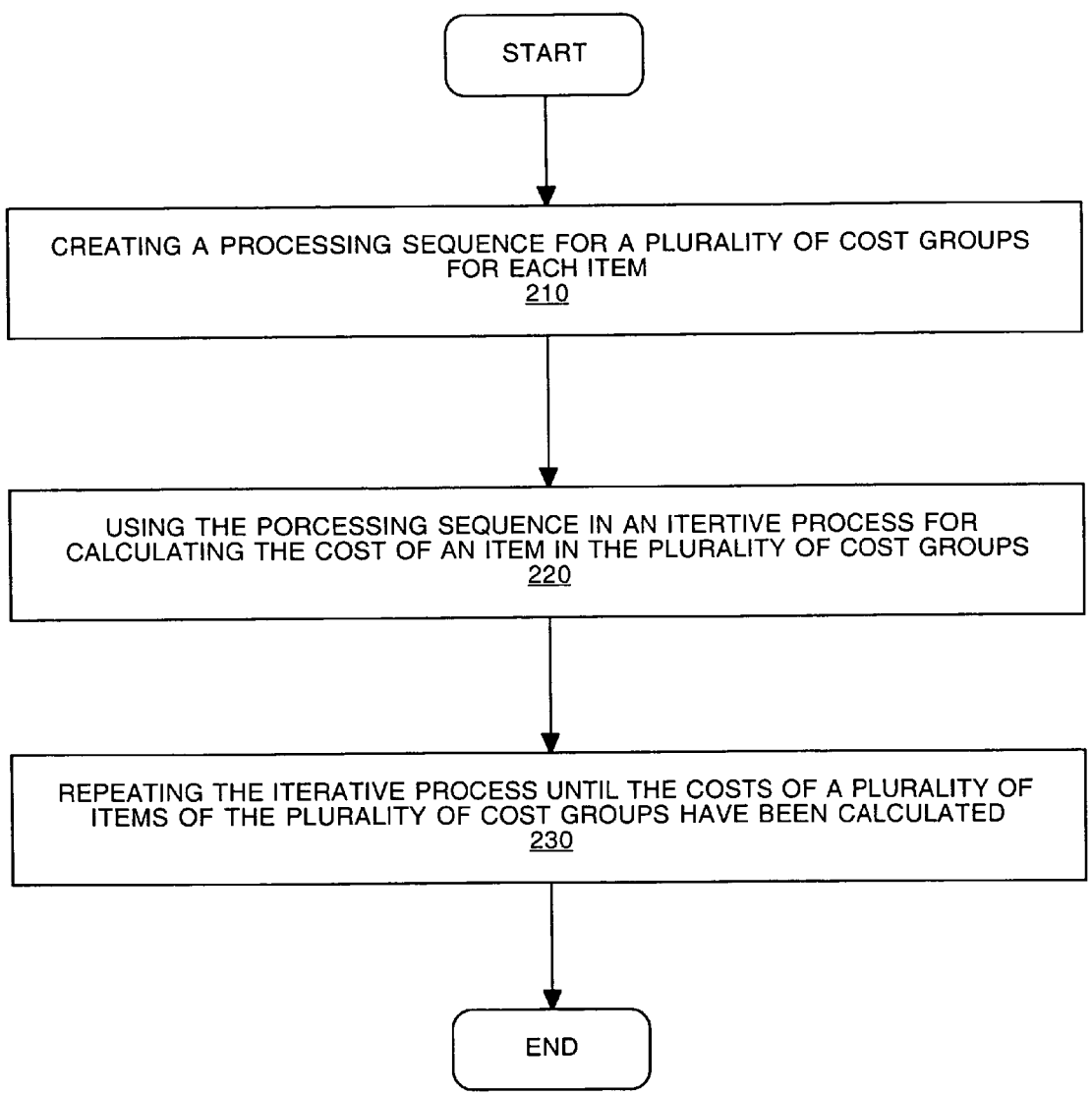

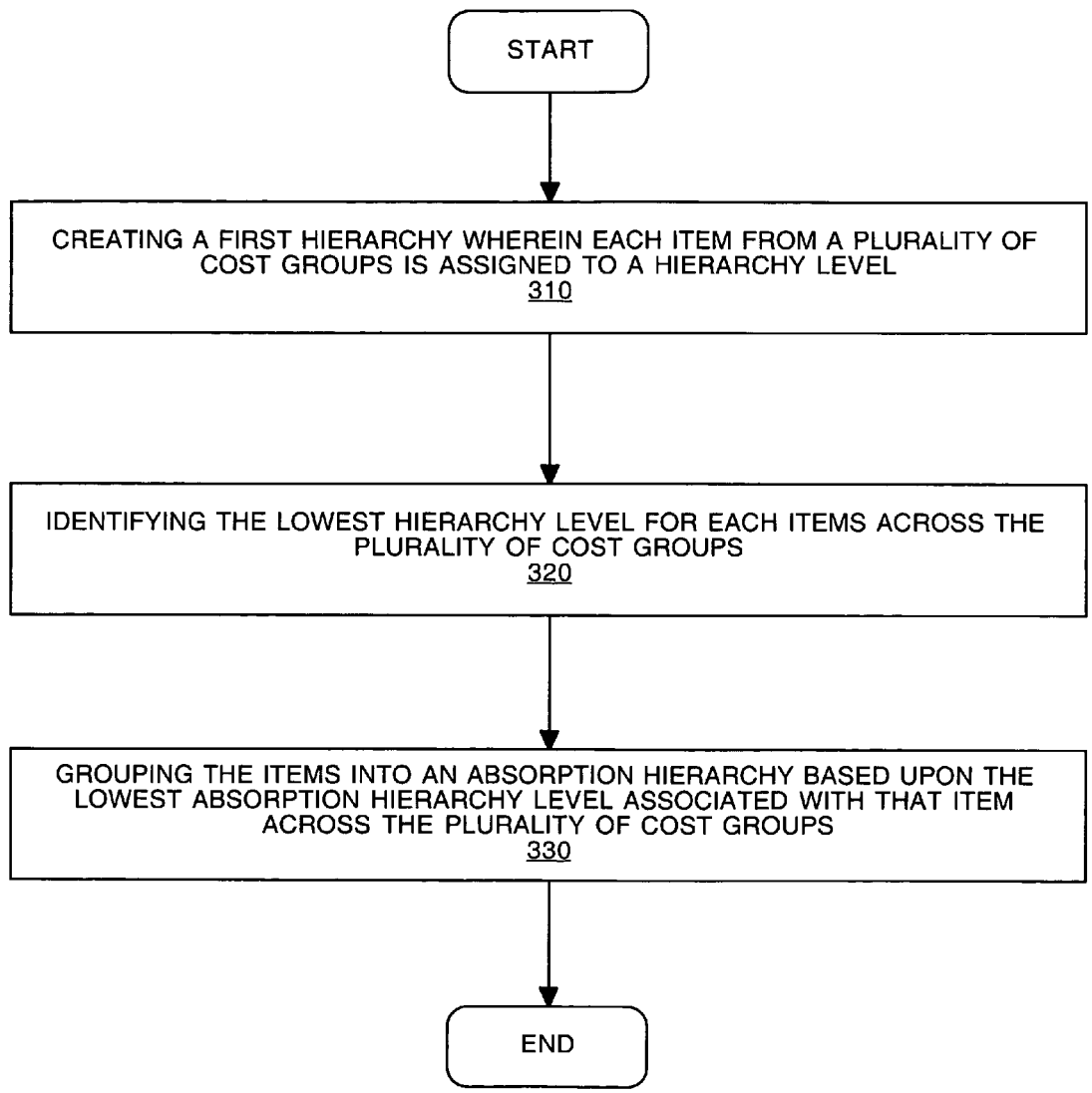
300  FIGURE 3

METHOD AND SYSTEM FOR DETERMINING A COSTING SEQUENCE FOR TRANSFERS BETWEEN A PLURALITY OF COST GROUPS

RELATED APPLICATIONS

The present application claims priority from U.S. provisional patent application No. 60/608,677 filed Sep. 10, 2004 entitled "Absorption Cost Algorithm," by V. Javli, L. Velasquez, V. Pilan, and M. Nobre, assigned to the assignee of the present invention, and which is hereby incorporated by reference in its entirety herein.

FIELD OF THE INVENTION

Embodiments of the present invention are related to determining a processing sequence for determining cost calculations among a plurality of cost groups.

BACKGROUND OF THE INVENTION

The appropriate valuation and analysis of manufacturing costs have been for years a key factor in a successful business management. Manufacturing costs are commonly calculated on the basis of average cost, standard cost, periodic cost, last-in-first-out (LIFO) cost, or first-in-first-out (FIFO) cost. These costing methods are implemented on computer systems. Companies choose the costing method that is best suited for their business requirements, or that is required by law. It is not unusual to find companies using one method for fiscal or legal purposes and another for internal management analysis.

It is a common business scenario in some organizations to transfer products, sub-assemblies, and components among different cost groups (e.g., one or more factories, or warehouses). The cost of the goods being transferred, as well as freight and/or special charges involved in the transfer process, often impacts the average cost of the item. This is particularly true when inventory valuation is determined by the absorption costing method. In absorption costing, variable costs and some of the fixed costs are assigned to each item in the inventory.

Some scenarios for transferring materials can be defined very simply, thus simplifying the calculation of absorption costs and/or the sequence for calculating these costs. For example, FIG. 1A shows a simple transfer of an item between two cost groups. In FIG. 1A, cost group 1 typically fabricates an item B using component A. However, item B may also be transferred between cost group 1 and cost group 2, which uses item B as a component of item C.

In the scenario of FIG. 1A, the cost of item B to cost group 2 is affected by the cost of item B in cost group 1. In the same way, the cost of item B to cost group 1 is affected by the cost elements of cost group 2, thus creating a recursive process for the calculation of item B.

Other scenarios are more complex depending on the volume of the organizations and the relationships between them, thus complicating the calculation of absorption costs. For example, inter-organization transfer of goods between cost groups (e.g., warehouses, manufacturing plants, etc.) makes determining a costing sequence difficult. This is especially true in situations where an item, transferred between two or more cost groups, occupies different levels in the costing sequence of the respective cost groups.

As shown in FIG. 1B, there are transfers between cost group 1 (120), cost group 2 (130), and cost group 3 (140) and the proper sequence (110) for processing the transfer of items is not readily apparent. In cost group 1, item A3 is a component of item A2 and is in the lowest level of the costing sequence for cost group 1. In other words, the cost of item A2 is dependent upon the cost of item A3 while the cost of item A3 is not dependent upon other sub-assemblies. Item A2, which is in the middle level of the costing sequence for cost group 1, is in turn a component of item A1 which is in the highest level of the costing sequence of cost group 1. Thus, the cost of item A1 is dependent upon the cost of item A2, and in turn, item A3. In transaction 111, item A2 (122) may be transferred between cost group 1 and cost group 3.

Similarly, while item A1 is a finished product (e.g., in the highest level of the costing sequence) of cost group 1 (120), after it is transferred to cost group 2 (130) in transaction 112, it is in the lowest level of the costing sequence of cost group 2. Items A1 (121) and B3 (133) are components of item B2 (132), which is in turn a component of item B1 (131).

In cost group 3 (140), items A2 (122), B1 (131) and B3 (133) are in the lowest level of the costing sequence of the cost group and are components of item C1 (141). The problem typically encountered with an arrangement as complex as that shown in FIG. 1B is in defining where to begin the costing sequence. In other words, it is not readily apparent which cost group initiates the costing sequence to the other cost groups because the items are transferred between cost groups. In one conventional method the lowest level components for each cost group are costed simultaneously. Thus, items A3 (123), A1 (121), B3 (133), and A2 (122) are costed at the same time. Additionally, all inter-organization transfers between cost groups (e.g., transactions 111, 112, 113, and 114) are costed simultaneously. Then, a "roll-up" of the costs was performed wherein the cost for each level in the costing sequence was calculated.

Obviously, this costing sequence can be inaccurate because the cost of some components is not accurately calculated. More specifically, while the costing of items without dependencies (e.g., item A3 123) could be accurately determined, for other items it is not apparent which cost group should initiate the costing of the item. This in turn affects the calculation of the inter-organization transfers. For example questions arise such as; should item A1 (121) should be costed as an end product of cost group 1 (120) or a transfer from cost group 2 (130)? Should all of the components at the lowest level of the costing sequence (e.g., A3 (123), A1 (121), B1 (131), B3 (133), and A2 (122) be costed first? If this were the sequence, how is the cost of item A1 (121) calculated for cost group 2 (130) since its cost depends, in part, on the cost of item A3 (121) in cost group 1 (120) in which it is not a component? Should the items in cost group 1 (120) be costed first and then cost the other cost groups sequentially? If this is the sequence, how does this affect the cost of item A2 (122) for cost group 1 (120) since its cost is affected by the cost of item A2 (122) in cost group 3?

SUMMARY OF THE INVENTION

Accordingly, need exists for a method for determining a costing sequence which accounts for transfers of items between cost groups. While meeting the above stated need, it is desirable that such a method determines a sequence for processing transfer costs to prevent negative inventory balances.

Embodiments of the present invention are directed to a computer implemented method for sequencing cost calculation. In one embodiment a processing sequence, comprising a plurality of hierarchy levels, is created for a plurality of cost groups. The processing sequence is used in an iterative process for calculating the cost of an item of the plurality of cost groups. In embodiments of the present invention, the iterative process is repeated until the costs of a plurality of items of the plurality of cost groups have been calculated.

For example, in one embodiment of the present invention a first hierarchy is created and one or more items from each of a plurality of cost groups is assigned to a level in the first hierarchy. In one embodiment of the present invention, determination of the level to which the item is assigned is based upon a corresponding level in a bill of materials (BOM) for that cost group or plurality of cost groups. In one embodiment, the levels in the first hierarchy are ordered so that an item which is lower in the BOM in a cost group is assigned to a higher level in the first hierarchy than an item which is higher in the BOM in that cost group. In other words, there is an inverse relationship between the BOM level of an item in a cost group and the corresponding hierarchy level to which that item is assigned in the first hierarchy. Thus, an item which is higher in the BOM level of a cost group is assigned to a correspondingly lower hierarchy level in the first hierarchy.

In embodiments of the present invention, the lowest level in the first hierarchy assigned to a given item across all of the cost groups is identified. As a result, the highest BOM level of that item across all of the cost groups is identified. In embodiments of the present invention, if an item is assigned to different BOM levels in a plurality of cost groups, the item is assigned to the highest BOM level across all of the cost groups. Thus, when assigned to a level in the first hierarchy, it is assigned to the corresponding lowest hierarchy level applicable.

In embodiments of the present invention, an iterative process is then performed to calculate the cost of the items based upon the sequence of the items in the first hierarchy. In embodiments of the present invention, the sequence comprises starting at the highest hierarchy level in the first hierarchy (e.g., the lowest BOM level) and successively processing the lower hierarchy levels (e.g., the higher BOM levels). In embodiments of the present invention, an item is not costed in the iterative process until all of the items (e.g., sub-assemblies and/or components) comprising that item have been previously costed. In embodiments of the present invention, the iterative process is repeated until the costs of all of a plurality of items of the plurality of cost groups have been calculated.

Embodiments of the present invention provide a computer implemented method for sequencing cost calculations which facilitates determining absorption costs, especially in instances when transfers of items between cost groups complicates determining where to initiate the costing sequence.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

FIG. 2 is a flowchart of a computer implemented method for sequencing cost calculations in accordance with embodiments of the present invention.

FIG. 3 is a flowchart of a computer implemented method for creating a processing sequence in accordance with embodiments of the present invention.

DETAILED DESCRIPTION OF THE PREFERRED EMBODIMENT

Figure 1A:
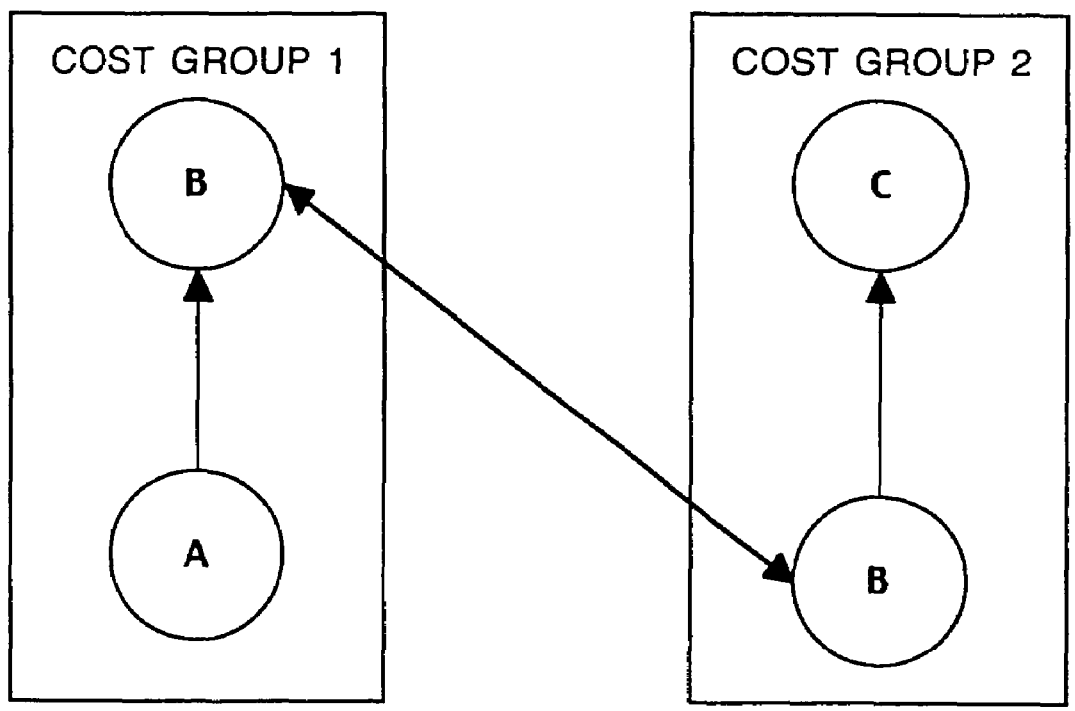
FIGS. 1A and 1B show scenarios of transfers between cost groups in accordance with the prior art.

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "creating," "using," "repeating," "identifying," "assigning," "determining," "calculating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

FIG. 2 is a flowchart of a method 200 for sequencing cost calculations in accordance with embodiments of the present invention. In step 210 of FIG. 2, a processing sequence for a plurality of cost groups for each inventory item is created. For clarity, the following discussion will refer to the scenario previously shown in FIG. 1B and to FIG. 3 which is a flowchart of a method 300 for creating a processing sequence in accordance with embodiments of the present invention.

Referring now to step 310 of FIG. 3, a first hierarchy is created wherein each item from the plurality of cost groups is assigned to a hierarchy level. Table 1 shows an exemplary first hierarchy used to create a processing sequence in embodiments of the present invention.

TABLE 1

| | HIERARCHY LEVEL | | |
|---|---|---|---|
| ITEM # | CG 1 | CG 2 | CG 3 |
| A3 | 1000 | | |
| A2 | 999 | | 1000 |
| A1 | 998 | 1000 | |
| B3 | | 1000 | 1000 |
| B2 | | 999 | |
| B1 | | 998 | 1000 |
| C1 | | | 999 |

Figure 1B:
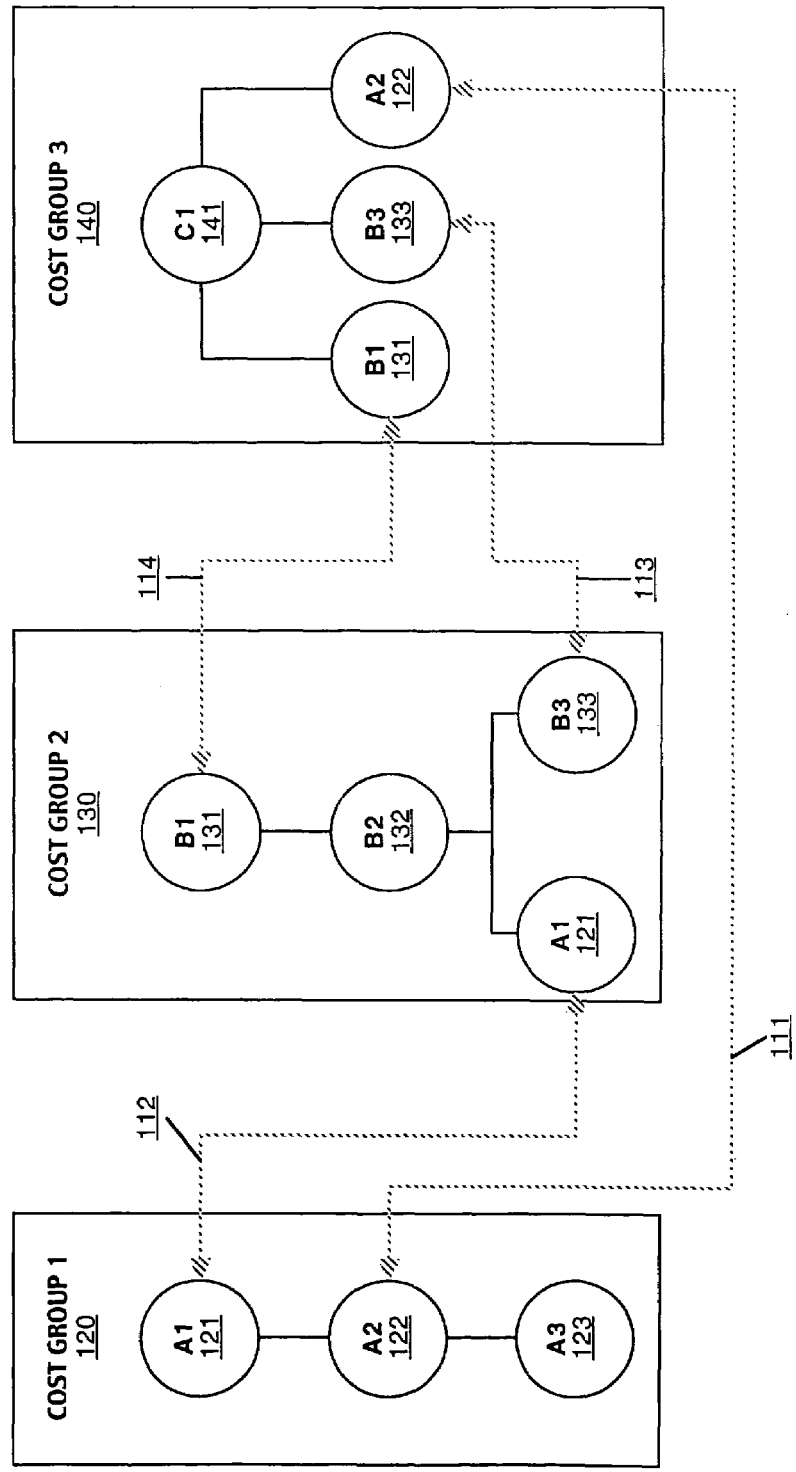

With reference to FIG. 1B, and as shown in table 1, each of the items for each of the cost groups is assigned to a level in the first hierarchy. In embodiments of the present invention, the determination of which level of the first hierarchy to which the item is assigned is based upon the corresponding level of that item in the existing Bill of Materials (BOM) product structure for each cost group. A BOM product structure is typically defined as a memory stored formally structured hierarchical classification of the items which comprise a product (e.g., a finished or semi-finished product). The BOM product structure facilitates understanding how materials, component parts and sub-assemblies come together in the manufacturing process by showing these components in a hierarchical structure. For example, referring again to FIG. 1B, the BOM product structure for cost group 1 (120) shows that item A3 (123) is a sub-component of item A2 (122), which is in turn a sub-component of item A1 (121). The BOM product structures shown in FIG. 1B also clearly show the dependencies between items in a cost group and between the cost groups. For example, in cost group 1 (120) item A2 is dependent upon at least one item A3 (123) during the manufacturing process. Similarly, item B2 (132) of cost group 2 (130) is dependent upon at least one item A1 (121) and one item B3 (133).

In embodiments of the present invention, the items of the cost groups are ranked in inverse order as shown in Table 1. That is, an item in the lowest BOM level of the BOM product structure for a given cost group is assigned to the highest level in the hierarchy of Table 1. Conversely, an item which is in a higher level of the BOM product structure is assigned to a lower hierarchy level in the hierarchy of Table 1. Thus, item A3 (123) is assigned to the highest hierarchy level in Table 1 (e.g., 1000) for cost group 1 because it is in the lowest level of the BOM product structure for cost group 1. Item A2 (122) is in the next higher level of the BOM product structure for cost group 1 (120) and is therefore assigned to the next lower hierarchy level (e.g., 999) of Table 1 for cost group 1. Finally, item A1 (121) of cost group 1 (120) is in the highest level of the BOM product structure of cost group 1 (120) and is therefore assigned to the lowest hierarchy level (e.g., 998) of Table 1 for cost group 1. It is appreciated that the assignment of items to corresponding levels in Table 1 is exemplary and that, in another embodiment, the ordering of the levels may be different, for example, in the same order as the BOM product structure.

Referring still to Table 1, items A1 (121) and B3 (133) are in the lowest level of the BOM product structure of cost group 2 (130) and are therefore assigned to the highest hierarchy level (e.g., 1000) of Table 1 for that cost group. Item B2 (132) of cost group 2 (130) is in the next higher level in the BOM product structure and therefore is assigned to the next lower hierarchy level (e.g., 999) of Table 1 for that cost group. Finally, item B1 (131) is in the highest level of the BOM product structure and is therefore assigned to the next lower level (e.g., 998) in Table 1.

In cost group 3 (140), items B1 (131), B3 (133), and A2 (122) are in the lowest level of the BOM product structure and therefore are assigned to the highest hierarchy level of Table 1 for cost group 3. Item C1 (141) is in the next higher level of the BOM product structure of cost group 3 (140) and is therefore assigned to the next lower hierarchy level (e.g., 999) for cost group 3 (140) in Table 1.

In step 320 of FIG. 3, the highest BOM level for each item across the plurality of cost groups is identified. As discussed above, there is an inverse relationship between the level an item occupies in the BOM product structure of a cost group and its corresponding ranking in the first hierarchy (e.g., Table 1 above). Referring now to Table 2, the highest BOM level for each item is identified across all of the cost groups by identifying the lowest hierarchy level assigned to an item in the first hierarchy (e.g., Table 1).

TABLE 2

| | HIERARCHY LEVEL | | | LOWEST HIERARCHY LEVEL ACROSS COST GROUPS |
|---|---|---|---|---|
| ITEM | CG 1 | CG 2 | CG 3 | |
| A3 | 1000 | | | 1000 |
| A2 | 999 | | 1000 | 999 |
| A1 | 998 | 1000 | | 998 |
| B3 | | 1000 | 1000 | 1000 |
| B2 | | 999 | | 999 |
| B1 | | 998 | 1000 | 998 |
| C1 | | | 999 | 999 |

As shown in Table 2, the lowest hierarchy level that each item is assigned to across all of the cost groups is identified in the right side column. In embodiments of the present invention, when an item is assigned to more than one hierarchy level (e.g., the item is in more than one BOM level in one or more of the cost groups), it is assigned the lowest corresponding hierarchy level with which it is associated. Thus, while item A1 (121) is assigned to hierarchy level 1000 for cost group 2 (130), it is automatically assigned to hierarchy level 998 in step 320 because it is in a lower hierarchy level (e.g., 998) in cost group 1 (120). Similarly, item A2 (122) is assigned to hierarchy level 999 at this step and item B1 (131) is assigned to hierarchy level 998. This facilitates calculating the cost of sub-assemblies and components prior to calculating the cost of the item itself. As a result, embodiments of the present invention facilitate calculating the cost of finished items more accurately than some conventional costing methods which may not account for the cost of sub-components when calculating the cost of the finished item.

In step 330 of FIG. 3, the items are grouped into an absorption hierarchy based upon the lowest absorption hierarchy level for that item across the plurality of cost groups to which the item is assigned. Table 3 shows a absorption hierarchy based upon the lowest hierarchy level associated with that item in Table 2. As discussed above, in the present embodiment, there is an inverse relationship between the level an item occupies in the BOM product structure of a cost group and its ranking in the first hierarchy (e.g., Table 1 and Table 2 above). Thus, by basing the absorption hierarchy upon the lowest hierarchy level with which it is associated, the absorption hierarchy also sequences the items based upon the level of the BOM product structure which the item occupies across all of the cost groups. In the present example, the lowest absorption hierarchy level is 998 and the highest absorption hierarchy level is 1000.

TABLE 3

ABSORPTION HIERARCHY

| HIERARCHY LEVEL | ITEM |
|---|---|
| 1000 | A3, B3 |
| 999 | A2, B2, C1 |
| 998 | A1, B1 |

As shown in Table 3, items A3 and B3 have been grouped together into the highest level of the absorption hierarchy. Similarly, items A2, B2, and C1 have been grouped into the next lower level of the absorption hierarchy. Finally, items A1 and B1 have been grouped together into the lowest level of the absorption hierarchy. In embodiments of the present invention, the absorption hierarchy shown in Table 3 defines the processing sequence for calculating cost calculations.

Returning to FIG. 2, in step 220, the processing sequence of step 210 (e.g., the absorption hierarchy shown in Table 3) is used in an iterative process for calculating the cost of an item in the plurality of cost groups. In embodiments of the present invention, the costs of the items identified in the absorption hierarchy of Table 3 are calculated by a process which runs in a loop. In the present embodiment, the loop starts at level 1000 and calculates the cost of the items at that level before processing the costs of the items in the next lower level (e.g., 999). Thus, an item is eligible to be processed while the algorithm is processing the absorption hierarchy level of that item. For example, items A3 and B3 are eligible items when absorption level 1000 is being processed, items A2, B2, and C1 are eligible items when absorption level 999 is being processed, and items A1 and B1 are eligible items when absorption level 998 is being processed.

Furthermore, in embodiments of the present invention, the cost of an item is not calculated unless it is a qualified item. In embodiments of the present invention, a qualified item complies with the following conditions:

It is an eligible item;
All of its component items have been previously costed (e.g., the cost is known for all of the cost derived transactions for the item such as a work in process (WIP) component).

Furthermore, an item which was previously costed is no longer considered to be a qualified item. Referring again to Table 3, in level 1000 items A3 and B3 are qualified items because they are eligible to be costed and because they are not dependent upon sub-components (e.g., all of their component items have been previously costed). In level 999, item A2 is qualified because its component item (e.g., item A3) was costed in the previous level. Items B2 and C1 are not yet qualified because they are dependent upon sub-components which have not yet been costed. In level 998, item A1 is qualified because its sub-component item (e.g., item A2) was costed in the previous level. However, item B1 is not qualified because it is dependent upon a sub-component (e.g., B2) which has not yet been costed.

In step 230 of FIG. 2, the iterative process is repeated until the costs of a plurality of items of the plurality of cost groups have been calculated. As described above, in the present embodiment the process runs in a loop which starts at the highest absorption hierarchy level (e.g., 1000). Additionally, the process repeats the loop until all qualified items have been costed. Thus, in embodiments of the present invention, there is no limit on the number of loops which may be run. As described above, an item is not qualified to be costed until the sub-components for that item have been previously costed. Items that were not qualified in one loop of the iterative process may be qualified in a successive loop because its sub-components have now been costed. In other words, after one loop of the iterative process has been completed, additional items from the absorption hierarchy of Table 3 will become qualified to be costed. Thus, embodiments of the present invention repeat the iterative process until the items in the absorption hierarchy have been costed.

The following example will use the absorption hierarchy of Table 3 to define the sequencing of cost calculations in accordance with embodiments of the present invention. In the first loop, the iterative process first accesses absorption hierarchy level 1000 in which items A3 and B3 are eligible items. The cost of items A3 and B3 are calculated because both of those items are qualified to be costed. Since there are no more items to be costed in the current absorption hierarchy level, the iterative process proceeds to the next lower level (e.g., level 999).

The iterative process then accesses absorption hierarchy level 999 in which items A2, B2, and C1 are eligible items. The cost of item A2 is calculated because it is a qualified item (e.g., the cost of dependent item A3 has previously been calculated). However, items B2 and C1 are not qualified to be costed in this loop of the iterative process because each of them is dependent upon a sub-component which has not yet been costed (e.g., items A1 and B1 respectively). Since there are no more items to be costed in the current absorption hierarchy level, the iterative process proceeds to the next lower level (e.g., 998) in the absorption hierarchy.

The iterative process then accesses absorption hierarchy level 998 in which items A1 and B1 are eligible items. The cost of item A1 is calculated because it is a qualified item (e.g., the cost of dependent item A2 has been previously calculated). However, item B1 is not a qualified item because item B2 has not yet been costed. Since there are no more items in the current level to be costed, and there are no more absorption hierarchy levels in the processing sequence, the current loop of the iterative process is completed. However, because there are still items in the absorption hierarchy that have not been costed, the iterative process will return to the top of the absorption hierarchy to begin a second loop.

In absorption hierarchy level 1000, all of the items (e.g., A3 and B3) have already been costed. Thus, no items are qualified to be costed in absorption hierarchy level 1000 and the iterative process proceeds to the next lower level (e.g., 999) of the absorption hierarchy.

In absorption hierarchy level 999, items B2 and C1 are eligible items. The cost of item B2 is then calculated because it is a qualified item (e.g., the cost of dependent items A1 and B3 have been previously calculated). However, item C1 is still not a qualified item because dependent item B1 has still not been costed. The iterative process then proceeds to the next lower level (e.g., 998) of the absorption hierarchy.

In absorption hierarchy level 998, item B1 is now qualified to be processed because the cost of dependent item B2 has been calculated previously. Because there are no more items to be costed in the current absorption hierarchy level, and there are no more absorption hierarchy levels in the processing sequence, the iterative process returns to the bottom of the absorption hierarchy.

In the third loop of the iterative process, all items in absorption hierarchy level 1000 have been costed previously. Therefore the iterative process proceeds to the next lower level (e.g., 999) in which item C1 is now qualified because its dependent items (e.g., A2, B1, and B3) have been costed previously. After the cost of item C1 has been determined, there are no more qualified items remaining in absorption hierarchy level 999 and the iterative process proceeds to the next lower level (e.g., 998). In absorption hierarchy level 998, there are no more remaining qualified items to be costed and the iterative process is completed.

Figure 4A:
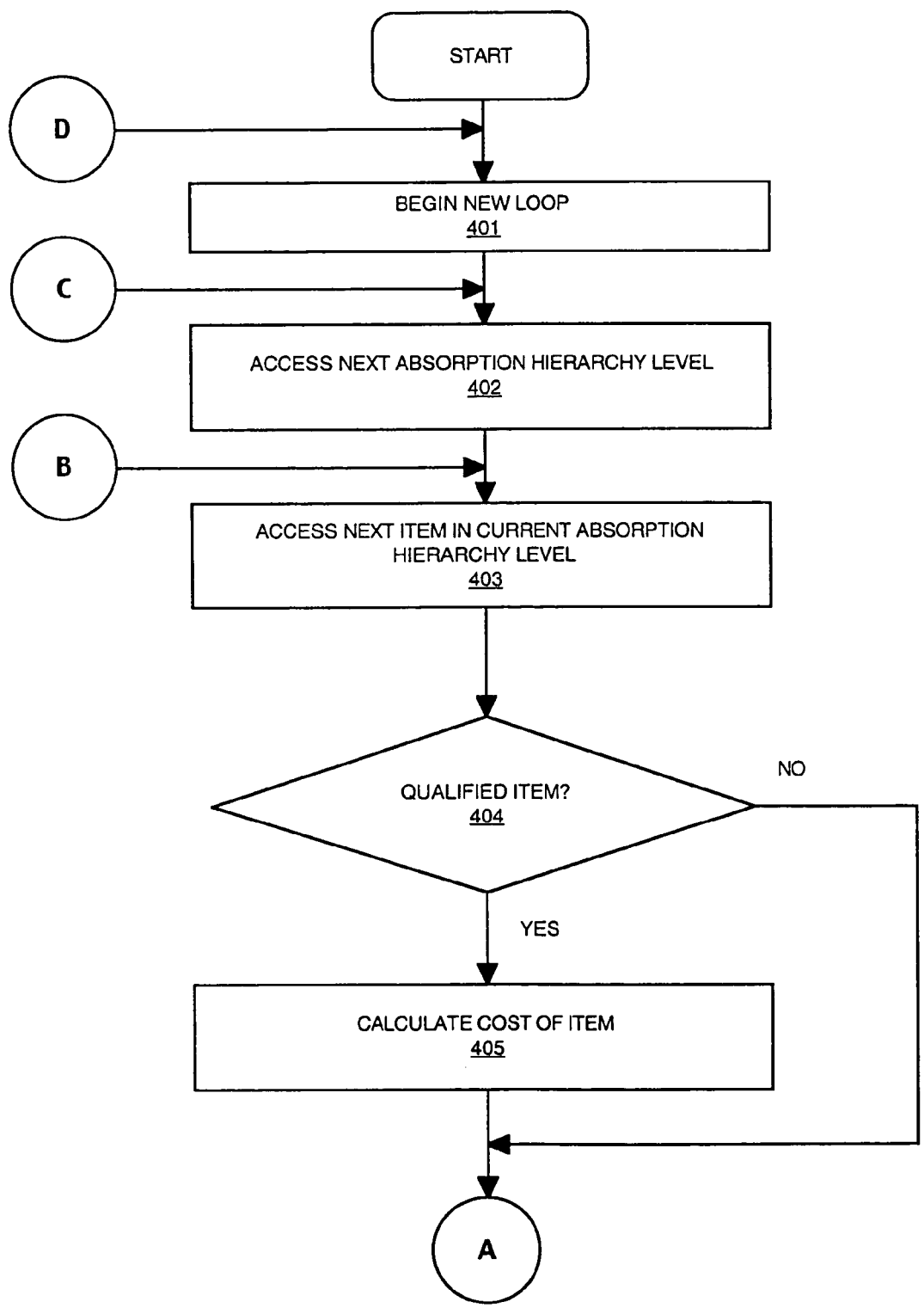
FIGS. 4A and 4B are a flowchart of a computer implemented iterative process for calculating the cost of items in accordance with embodiments of the present invention.
Figure 4B:
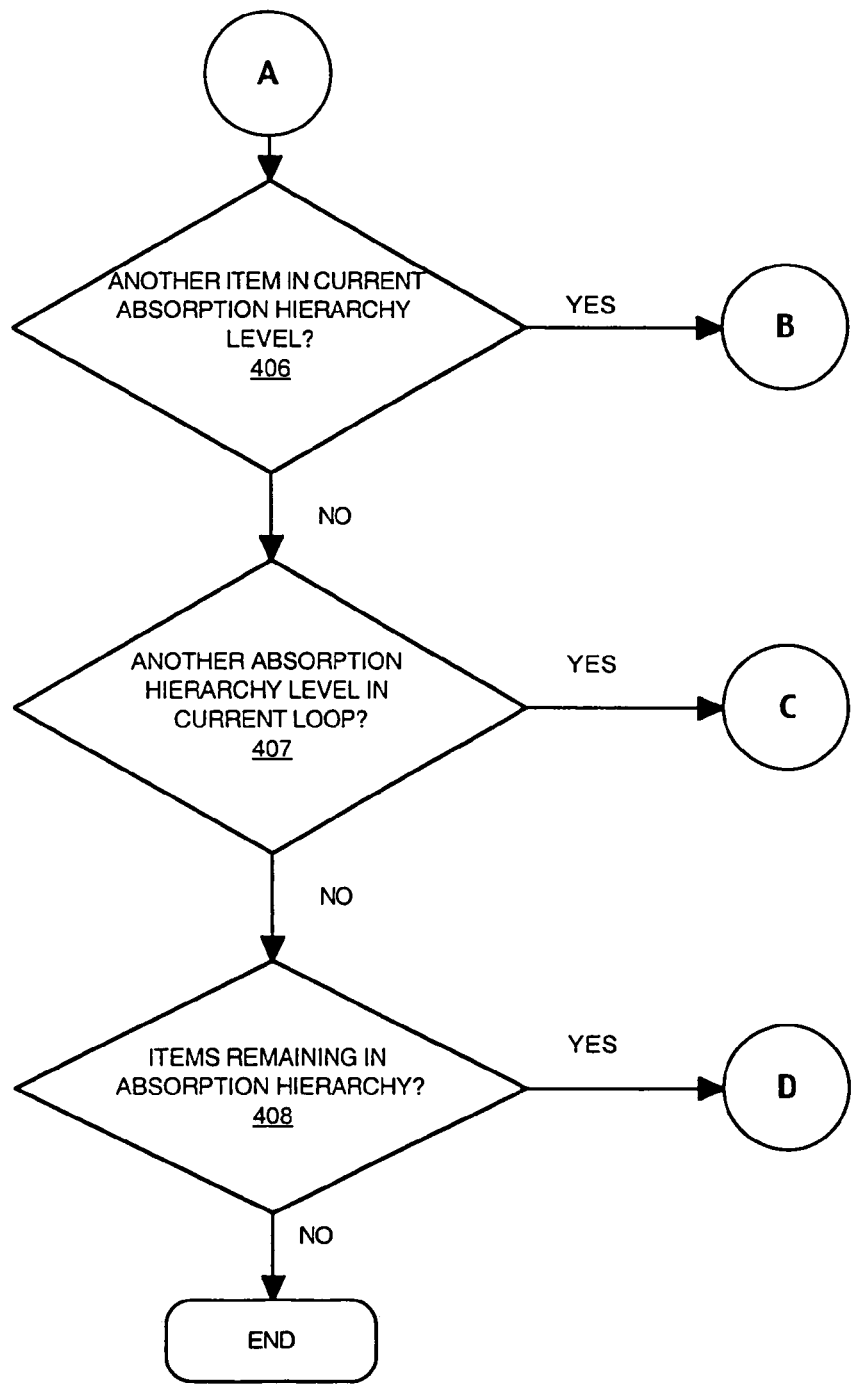

FIGS. 4A and 4B are a flowchart of an iterative process 400 used in accordance with embodiments of the present invention. In step 401, a loop of the iterative process is initiated.

In step 402, the next absorption hierarchy level is accessed. Referring again to Table 3 above, the absorption hierarchy defines a processing sequence for calculating the cost of items. In the present embodiment, items in level 1000 are accessed prior to items in level 999 or 998 and thus, level 1000 is accessed first.

In step 403, the first item in the current absorption hierarchy level is accessed. For example item A3 of item is accessed. In embodiments of the present invention, a further ordering of the sequence items within a given absorption hierarchy level may occur. However, in the present embodiment, this ordering does not occur.

In step 404, a determination is made whether the currently accessed item is a qualified item. As described above with reference to step 220 of FIG. 2, an item is qualified to be costed if it is both an eligible item (e.g., assigned to the currently accessed absorption hierarchy level) and if the subcomponents of that item have previously been costed. If the item is a qualified item, method 400 proceeds to step 405. If the item is not a qualified item, method 400 proceeds to step 406.

In step 405, the cost of the currently accessed item is calculated. There are a variety of methods for determining the cost of an item in accordance with embodiments of the present invention. In one embodiment, absorption costing is used to determine the cost of the items. However, embodiments of the present invention are not limited to this costing method alone. In embodiments of the present invention, after an item has been costed, it is then removed from the processing sequence.

In step 406, it is determined whether there is another item in the currently accessed absorption hierarchy level. If there is another item in the currently accessed absorption hierarchy level which has not yet been costed, method 400 returns to step 403 and the next item in the currently accessed absorption hierarchy level is accessed. If there are no more items in the currently accessed absorption hierarchy level, method 400 proceeds to step 407.

In step 407, it is determined whether another absorption hierarchy level remains in the current loop of the iterative process. If there are additional absorption hierarchy levels (e.g., absorption levels 999, and 998) which have not yet been processed in the current processing loop, method 400 returns to step 402 and the next absorption hierarchy level (e.g., absorption level 999) is accessed. If there are no additional absorption hierarchy levels which have not yet been processed in the current processing loop, method 400 proceeds to step 408.

In step 408, it is determined whether there are any remaining items in the absorption hierarchy which have not yet been costed. If there are remaining items in the additional absorption hierarchy levels which have not yet been costed in the current processing loop, method 400 returns to step 401 and a new processing loop is initiated. If there no remaining items in the absorption hierarchy levels, the iterative process is completed.

Figure 5:
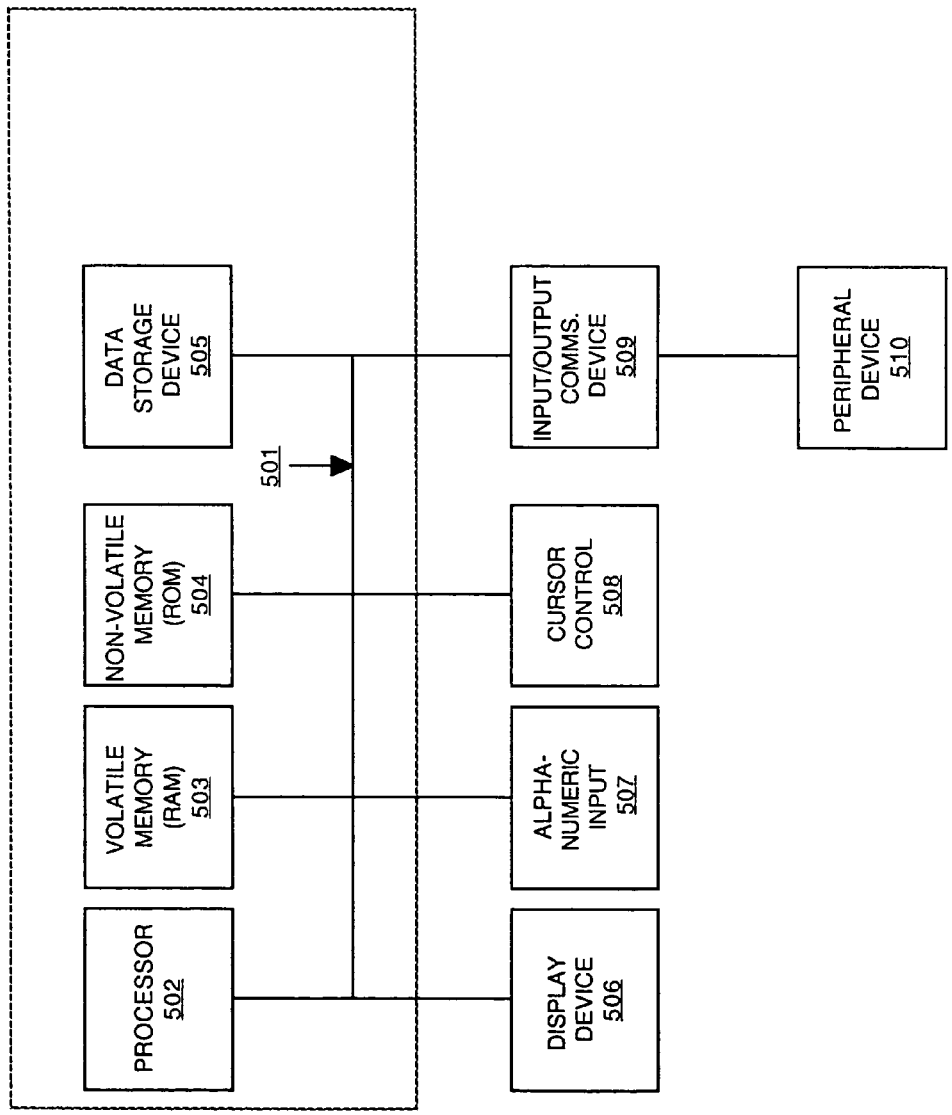
FIG. 5 is a block diagram of an exemplary computer system upon which embodiments of the present invention may be implemented.

FIG. 5 is a block diagram of an exemplary computer system upon which embodiments of the present invention may be implemented. With reference to FIG. 5, portions of the present invention are comprised of computer-readable and computer-executable instructions that reside, for example, in computer system 500 which may be used as a part of a general purpose computer network (not shown). It is appreciated that computer system 500 of FIG. 5 is exemplary only and that the present invention can operate within a number of different computer systems including general-purpose computer systems, embedded computer systems, laptop computer systems, hand-held computer systems, and stand-alone computer systems.

In the present embodiment, computer system 500 includes an address/data bus 501 for conveying digital information between the various components, a central processor unit (CPU) 502 for processing the digital information and instructions, a volatile main memory 503 comprised of volatile random access memory (RAM) for storing the digital information and instructions, and a non-volatile read only memory (ROM) 504 for storing information and instructions of a more permanent nature. In addition, computer system 500 may also include a data storage device 505 (e.g., a magnetic, optical, floppy, or tape drive or the like) for storing vast amounts of data. It should be noted that the software program for performing the method for determining absorption costs for transfers between a plurality of cost groups of the present invention can be stored either in volatile memory 503, data storage device 505, or in an external storage device (not shown).

Devices which are optionally coupled to computer system 500 include a display device 506 for displaying information to a computer user, an alpha-numeric input device 507 (e.g., a keyboard), and a cursor control device 508 (e.g., mouse, trackball, light pen, etc.) for inputting data, selections, updates, etc. Computer system 500 can also include a mechanism for emitting an audible signal (not shown).

Furthermore, computer system 500 can include an input/output (I/O) signal unit (e.g., interface) 509 for interfacing with a peripheral device 510 (e.g., a computer network, modem, mass storage device, etc.). Accordingly, computer system 500 may be coupled in a network, such as a client/server environment, whereby a number of clients (e.g., personal computers, workstations, portable computers, minicomputers, terminals, etc.) are used to run processes for performing desired tasks. In particular, computer system 500 can be used in a method for sequencing cost calculations in accordance with embodiments of the present invention.

The preferred embodiment of the present invention, a method for sequencing cost calculations, is thus described. While the present invention has been described in particular embodiments, it should be appreciated that the present invention should not be construed as limited by such embodiments, but rather construed according to the following claims.

What is claimed is:

1. A computer-implemented method of sequencing cost calculations, said method comprising:

creating at a computer system a processing sequence for a plurality of cost groups, each cost group comprising one or more inventory premises and one or more items and said cost group being associated with its own corresponding bill of materials classifying said one or more items, the cost of at least one item of a first cost group of the plurality of cost groups depending on the absorption cost of another item of a second cost group of the plurality of cost groups, the absorption cost based at least in part on the one or more inventory premises for the item of the second cost group, and said processing sequence comprising a plurality of hierarchy levels;

calculating, via the computer system and using said processing sequence in an iterative process, the cost of an item of said plurality of cost groups; and repeating, via the computer system, said iterative process until the costs of a plurality of items of said plurality of cost groups have been calculated.

2. The method as recited in claim 1 wherein said creating a processing sequence further comprises:

identifying a plurality of hierarchy levels for said item wherein a respective hierarchy level of said item is determined for each respective cost group using said item.

3. The method as recited in claim 2 wherein said creating a processing sequence further comprises:

assigning a lower hierarchy level of said plurality of hierarchy levels to said item if said item is being associated with more than one hierarchy level.

4. The method as recited in claim 3 wherein said creating a processing sequence further comprises: processing an item which has a higher hierarchy level before an item which has a lower hierarchy level.

5. The method as recited in claim 4 wherein said iterative process further comprises:

determining whether said item comprises at least one sub-component.

6. The method as recited in claim 5 wherein said iterative process further comprises:

determining whether the cost of said at least one sub-component has been previously calculated.

7. The method as recited in claim 6 wherein said iterative process further comprises:

calculating the cost of said item if the cost of said at least one sub-component has been previously calculated.

8. A computer storage medium having computer readable program code stored thereon for causing a computer system to perform a method of sequencing cost calculations, said method comprising:

creating a processing sequence for a plurality of cost groups, each cost group comprising one or more inventory premises and one or more items and said cost group being associated with its own corresponding bill of materials classifying said one or more items, the cost of at least one item of a first cost group of the plurality of cost groups depending on the absorption cost of another item of a second cost group of the plurality of cost groups, the absorption costs based at least in part on the one or more inventory premises for the item of the second cost group, and said processing sequence comprising a plurality of hierarchy levels;

calculating, via the computer system and using said processing sequence in an iterative process, the cost of an item of said plurality of cost groups; and repeating, via the computer system, said iterative process until the costs of a plurality of items of said plurality of cost groups have been calculated.

9. The computer storage medium of claim 8 wherein said creating a processing sequence further comprises: identifying a plurality of hierarchy levels for said item wherein a respective hierarchy level of said item is determined for each respective cost group using said item.

10. The computer storage medium of claim 9 wherein said creating a processing sequence further comprises: assigning a lower hierarchy level of said plurality of hierarchy levels to said item if said item is being associated with more than one hierarchy level.

11. The computer storage medium of claim 10 wherein said creating a processing sequence further comprises: processing an item which has a higher hierarchy level before an item which has a lower hierarchy level.

12. The computer storage medium of claim 11 wherein said iterative process further comprises: determining whether said item comprises at least one sub-component.

13. The computer storage medium of claim 12 wherein said iterative process further comprises: determining whether the cost of said at least one sub-component has been previously calculated.

14. The computer storage medium of claim 13 wherein said iterative process further comprises: calculating the cost of said item if the cost of said at least one sub-component has been previously calculated.

15. A computer system comprising:

a bus;

a memory coupled with said bus;

and a processor coupled with said bus, said processor adapted to perform the following:

creating a processing sequence for a plurality of cost groups, each cost group comprising one or more inventory premises and one or more items and said cost group being associated with its own corresponding bill of materials classifying said one or more items, the cost of at least one item of a first cost group of the plurality of cost groups depending on the absorption cost of another item of a second cost group of the plurality of cost groups, the absorption costs based at least in part on the one or more inventory premises for the item in the second cost group, and said processing sequence comprising a plurality of hierarchy levels;

calculating, via the computer system and using said processing sequence in an iterative process, the cost of an item of said plurality of cost groups; and repeating, via the computer system, said iterative process until the costs of a plurality of items of said plurality of cost groups have been calculated.

16. The computer system of claim 15 wherein said creating a processing sequence further comprises:

identifying a plurality of hierarchy levels for said item wherein a respective hierarchy level of said item is determined for each respective cost group using said item.

17. The computer system of claim 16 wherein said creating a processing sequence further comprises:

assigning a lower hierarchy level of said plurality of hierarchy levels to said item if said item is associated with more than one hierarchy level.

18. The computer system of claim 17 wherein said creating a processing sequence further comprises: processing an item which has a higher hierarchy level before an item which has a lower hierarchy level.

19. The computer system of claim 18 wherein said iterative process further comprises:

determining whether said item comprises at least one sub-component; and determining whether the cost of said at least one sub-component has been previously calculated.

20. The computer system of claim 19 wherein said iterative process further comprises:

calculating the cost of said item if the cost of said at least one sub-component has been previously calculated.

* * * * *

UNITED STATES PATENT AND TRADEMARK OFFICE
CERTIFICATE OF CORRECTION

| | | |
|---|---|---|
| PATENT NO. | : 7,725,367 B2 | Page 1 of 1 |
| APPLICATION NO. | : 11/100196 | |
| DATED | : May 25, 2010 | |
| INVENTOR(S) | : Veeresha Javli et al. | |

It is certified that error appears in the above-identified patent and that said Letters Patent is hereby corrected as shown below:

On sheet 3 of 7, in Figure 2, Box 220, line 1, delete "PORCESSING SEQUENCE IN AN ITERTIVE" and insert -- PROCESSING SEQUENCE IN AN ITERATIVE --, therefor.

In column 2, line 53, delete "3?" and insert -- 3. --, therefor.

Signed and Sealed this
Twenty-sixth Day of July, 2011

David J. Kappos
*Director of the United States Patent and Trademark Office*